United States Patent
Fousek et al.

(10) Patent No.: US 9,640,186 B2
(45) Date of Patent: May 2, 2017

(54) DEEP SCATTERING SPECTRUM IN ACOUSTIC MODELING FOR SPEECH RECOGNITION

(71) Applicant: International Business Machines Corporation, Armonk, NY (US)

(72) Inventors: Petr Fousek, Litomerice (CZ); Vaibhava Goel, Chappaqua, NY (US); Brian E. D. Kingsbury, Cortlandt Manor, NY (US); Etienne Marcheret, White Plains, NY (US); Shay Maymon, Raanana (IL); David Nahamoo, Great Neck, NY (US); Vijayaditya Peddinti, Baltimore, MD (US); Bhuvana Ramabhadran, Mt. Kisco, NY (US); Tara N. Sainath, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/268,459

(22) Filed: May 2, 2014

(65) Prior Publication Data

US 2015/0317990 A1    Nov. 5, 2015

(51) Int. Cl.
G10L 15/16      (2006.01)
G10L 19/02      (2013.01)
G10L 19/26      (2013.01)

(52) U.S. Cl.
CPC ............ *G10L 19/02* (2013.01); *G10L 19/26* (2013.01)

(58) Field of Classification Search
CPC .................................................... G10L 15/00
USPC .................................................... 704/231, 500
See application file for complete search history.

(56) References Cited

U.S. PATENT DOCUMENTS

| | | | |
|---|---|---|---|
| 5,309,379 A | 5/1994 | Rawlings et al. | |
| 6,253,175 B1* | 6/2001 | Basu et al. | 704/231 |
| 7,146,319 B2 | 12/2006 | Hunt | |
| 7,254,538 B1 | 8/2007 | Hermansky et al. | |
| 2007/0112568 A1* | 5/2007 | Fingscheidt et al. | 704/256.2 |
| 2008/0008173 A1* | 1/2008 | Kanevsky et al. | 370/389 |
| 2008/0312926 A1* | 12/2008 | Vair et al. | 704/249 |
| 2010/0166200 A1 | 7/2010 | Truong et al. | |
| 2012/0065976 A1* | 3/2012 | Deng et al. | 704/256.1 |
| 2012/0150541 A1 | 6/2012 | Talwar et al. | |
| 2015/0100312 A1* | 4/2015 | Bocchieri et al. | 704/232 |

OTHER PUBLICATIONS

Mallat et al., "Deep Learning by Scattering", Jun. 24, 2013, arxiv. org , p. 1-10.*
Bruna et al., "Audio Texture Synthesis with Scattering Moments", Nov. 2, 2013, arxiv.org, p. 1-5.*

(Continued)

*Primary Examiner* — David Hudspeth
*Assistant Examiner* — Shreyans Patel
(74) *Attorney, Agent, or Firm* — William Stock; Ryan, Mason & Lewis, LLP

(57) ABSTRACT

Deep scattering spectral features are extracted from an acoustic input signal to generate a deep scattering spectral feature representation of the acoustic input signal. The deep scattering spectral feature representation is input to a speech recognition engine. The acoustic input signal is decoded based on at least a portion of the deep scattering spectral feature representation input to a speech recognition engine.

16 Claims, 5 Drawing Sheets

(56) References Cited

OTHER PUBLICATIONS

G. Hinton et al., "Deep Neural Networks for Acoustic Modeling in Speech Recognition," IEEE Signal Processing Magazine, Nov. 2012, pp. 82-97, vol. 29, No. 6.
J. Bruna et al., "Audio Texture Synthesis with Scattering Moments," Computing Research Repository (CoRR), arXIV:1311.0407v1, Nov. 2013, 5 pages.
S.C. Zhu et al., "Minimax Entropy Principle and Its Application to Texture Modeling," Neural Computation, Nov. 1997, pp. 1627-1660, vol. 9, No. 8.
J.T. Anderson et al., "Acoustic Seabed Classification of Marine Physical and Biological Landscapes," International Council for the Exploration of the Sea (ICES), ICES Cooperative Research Report No. 286, Aug. 2007, 191 pages.
O. Abdel-Hamid et al., "Applying Convolutional Neural Networks Concepts to Hybrid NN-HMM Model for Speech Recognition," IEEE International Conference on Acoustics, Speech and Signal Processing (ICASSP), Mar. 2012, pp. 4277-4280, Kyoto, Japan.
S.B. Davis et al., "Comparison of Parametric Representations for Monosyllabic Word Recognition in Continuously Spoken Sentences," IEEE International Conference on Acoustics, Speech and Signal Processing (ICASSP), Aug. 1980, pp. 357-366, vol. 28, No. 4.
Hynek Hermansky, "Perceptual Linear Predictive (PLP) Analysis of Speech," Journal of Accoustical Society of America, Apr. 1990, pp. 1738-1752, vol. 87, No. 4.
H. Hermansky et al., "RASTA Processing of Speech," IEEE Transactions on Speech and Audio Processing, Oct. 1994, pp. 578-589, vol. 2, No. 4.
J. Andén et al., "Deep Scattering Spectrum," IEEE Transactions on Signal Processing, Jan. 2014, 15 pages.
M. Athineos et al., "Autoregressive Modeling of Temporal Envelopes," IEEE Transactions on Signal Processing, Nov. 2007, pp. 5237-5245, vol. 55, No. 11.
Sriram Ganapathy, "Signal Analysis Using Autoregressive Models of Amplitude Modulation," Ph.D. dissertation, Johns Hopkins University, Jan. 2012, 179 pages.
S. Mallat et al., "Deep Learning by Scattering," Computing Research Repository (CoRR), arXIV:1306.5532v1, Jun. 2013, 10 pages.
J. Bruna et al., "Invariant Scattering Convolution Networks," IEEE Transactions on Pattern Analysis and Machine Intelligence, Aug. 2013, pp. 1872-1886, vol. 35, No. 8.
L.F. Lamel et al., "Speech Database Development: Design and Analysis of the Acoustic-Phonetic Corpus," Proceedings of the DARPA Speech Recognition Workshop, Report No. SAIC-86/1546, Feb. 1986, pp. 61-70.
V. Peddinti et al., "Deep Scattering Spectrum with Deep Neural Networks," IEEE International Conference on Acoustics, Speech and Signal Processing (ICASSP), May 2014, pp. 361-364.
L. Lee et al., "Speaker Normalization Using Efficient Frequency Warping Procedures," IEEE International Conference on Acoustics, Speech and Signal Processing (ICASSP), May 1996, pp. 353-356, vol. 1.
M.J.F. Gales, "Maximum Likelihood Linear Transformations for HMM-Based Speech Recognition," Computer Speech and Language, Jan. 1998, pp. 75-98, vol. 12, No. 2.
S.Y. Zhao et al., "Multi-Stream Spectro-Temporal Features for Robust Speech Recognition," Proceedings of Interspeech, Sep. 2008, 4 pages, Brisbane, Australia.
Brian Kingsbury, "Lattice-Based Optimization of Sequence Classification Criteria for Neural-Network Acoustic Modeling," IEEE International Conference on Acoustics, Speech and Signal Processing (ICASSP), Apr. 2009, pp. 3761-3764, Taipei, Taiwan.
M. Athineos et al., "PLP Autoregressive Modeling of Auditory-Like 2-D Spectro-Temporal Patterns," ISCA Tutorial and Research Workshop on Statistical and Perceptual Audio Processing (SAPA), Oct. 2004, 5 pages, Jeju, Korea.
Michael Kleinschmidt, "Localized Spectro-Temporal Features for Automatic Speech Recognition," 8th European Conference on Speech Communication and Technology, Eurospeech-Interspeech, Sep. 2003, 4 pages, Geneva, Switzerland.
N. Mesgarani et al., "Discrimination of Speech from Nonspeech Based on Multiscale Spectro-Temporal Modulations," IEEE Transactions on Audio, Speech, and Language Processing, May 2006, pp. 920-930, vol. 14, No. 3.
T.N. Sainath et al., "Deep Convolutional Neural Networks for LVCSR," IEEE International Conference on Acoustics, Speech and Signal Processing (ICASSP), May 2013, pp. 8614-8618, Vancouver, British Columbia.
T.N. Sainath et al., "Improvements to Deep Convolutional Neural Networks for LVCSR," IEEE Workshop on Automatic Speech Recognition and Understanding (ASRU), Dec. 2013, 6 pages, Olomouc, Czech Republic.
R.A. Fisher, "The Use of Multiple Measurements in Taxonomic Problems," Annals of Eugenics, Sep. 1936, pp. 179-188, vol. 7, No. 2.
H. Soltau et al., "Joint Training of Convolutional and Non-Convolutional Neural Networks," IEEE International Conference on Acoustics, Speech and Signal Processing (ICASSP), May 2014, 5 pages.
Wikipedia, "TIMIT," http://en.wikipedia.org/wiki/TIMIT, Mar. 2014, 1 page.
IBM Corporation, "Scattering Features for Deep Neural Networks," Speech and Language Algorithms Group, Apr. 2014, 25 pages.
"Speech Recognition System Project Using Neural Networks (Final Project Report)," http://speech-recognition-project.blogspot.com/2006/12/introduction_8336.html, Dec. 2006, 5 pages.
T.N. Sainath et al., "Exemplar-Based Sparse Representation Features: From TIMIT to LVCSR," IEEE Transactions on Audio, Speech, and Language Processing, Nov. 2011, pp. 2598-2613, vol. 19, No. 8.
G. Saon et al., "Speaker Adaptation of Neural Network Acoustic Models Using I-Vectors," IEEE Workshop on Automatic Speech Recognition and Understanding (ASRU), Dec. 2013, pp. 55-59, Olomouc, Czech Republic.

* cited by examiner $\lambda_1, \lambda_2$

TIME

FREQUENCY

TIME

DEEP SCATTERING SPECTRUM IN ACOUSTIC MODELING FOR SPEECH RECOGNITION

FIELD OF THE INVENTION

The present application generally relates to speech recognition and, more particularly, to techniques for generating and using improved spectral features to improve speech recognition performance.

BACKGROUND OF THE INVENTION

An acceptable feature representation for any pattern recognition task (e.g., speech recognition) is one that preserves detail in the input signal, while remaining stable and invariant to non-informative distortions. While conventional speech features, such as log-mel, perceptual linear predictive (PLP), and relative spectral (RASTA), are all designed to be deformation stable, they remove important higher-order information from the speech signal. While better estimation techniques have been designed to preserve higher resolution detail, even these high resolution representations are processed using short term smoothing operators for deformation stability. As such, designing an appropriate feature representation is known to be challenging.

SUMMARY OF THE INVENTION

Illustrative embodiments of the invention provide techniques for generating and using improved spectral features to improve speech recognition performance. In particular, illustrative embodiments provide generation and use of deep scattering spectrum (DSS) feature representation to improve speech recognition performance.

For example, in one embodiment, a method comprises the following steps. Deep scattering spectral features are extracted from an acoustic input signal to generate a deep scattering spectral feature representation of the acoustic input signal. The deep scattering spectral feature representation is input to a speech recognition engine. The acoustic input signal is decoded based on at least a portion of the deep scattering spectral feature representation input to a speech recognition engine.

Advantageously, illustrative embodiments of the invention employ DSS feature representation techniques in a large vocabulary continuous speech recognition (LVCSR) system based on a hybrid neural network architecture. Further, illustrative embodiments provide dimension reduction techniques and speaker adaptation techniques with the DSS feature representation techniques.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments will be described herein in the context of illustrative methods, apparatus, articles of manufacture, and systems for providing speech recognition functions. It is to be appreciated, however, that embodiments of the invention are not limited to the specific methods, apparatus, articles of manufacture, and systems illustratively shown and described herein. Rather, embodiments of the invention are directed broadly to speech recognition techniques whereby improved recognition performance is attained via the generation and use of deep scattering spectrum (DSS) representation features in a hybrid neural network architecture. For this reason, numerous modifications can be made to the embodiments shown that are within the scope of the present invention. That is, no limitations with respect to the specific embodiments described herein are intended or should be inferred.

Deep scattering networks (DSN) have recently been introduced in S. Mallat, "Deep learning by scattering," Computing Resource Repository (CoRR), vol. abs/1306.5532, June 2013. DSNs take a raw signal and generate a contractive representation, which preserves signal energy, while ensuring Lipschitz continuity to deformations. A scattering representation includes log-mel like features (first-order scatter) together with higher order features that can preserve greater detail in the speech signal. The representation generated by these networks, called Deep Scattering Spectrum (DSS), is locally translation invariant and stable to time varying deformations, see J. Anden and S. Mallat, "Deep scattering spectrum," IEEE Transactions on Signal Processing, January 2014.

Illustrative embodiments of the invention provide for the generation and use of DSS features for large vocabulary continuous speech recognition (LVCSR) in a hybrid neural network architecture. In accordance with illustrative embodiments, multi-resolution time and frequency scattering representations are used in an LVCSR system. More particularly, illustrative embodiments incorporate 2nd-order (time) scatter and frequency scatter into the filtering process. Further, as the feature dimension for multi-resolution time and frequency scatter can be large (e.g., thousands), illustrative embodiments provide dimensionality reduction techniques to significantly reduce the feature dimension. Still further, LVCSR systems according to illustrative embodiments use speaker adaptation techniques including, but not limited to DSS-based adaptations of vocal tract length normalization (VTLN), feature space maximum likelihood linear regression (fMLLR), and i-vectors. In addition, illustrative embodiments employ time-frequency features using a hybrid neural network architecture including a combination of a convolutional neural network (CNN) with a deep neural network (DNN), with speaker adaptation and sequence-training.

Figure 1:
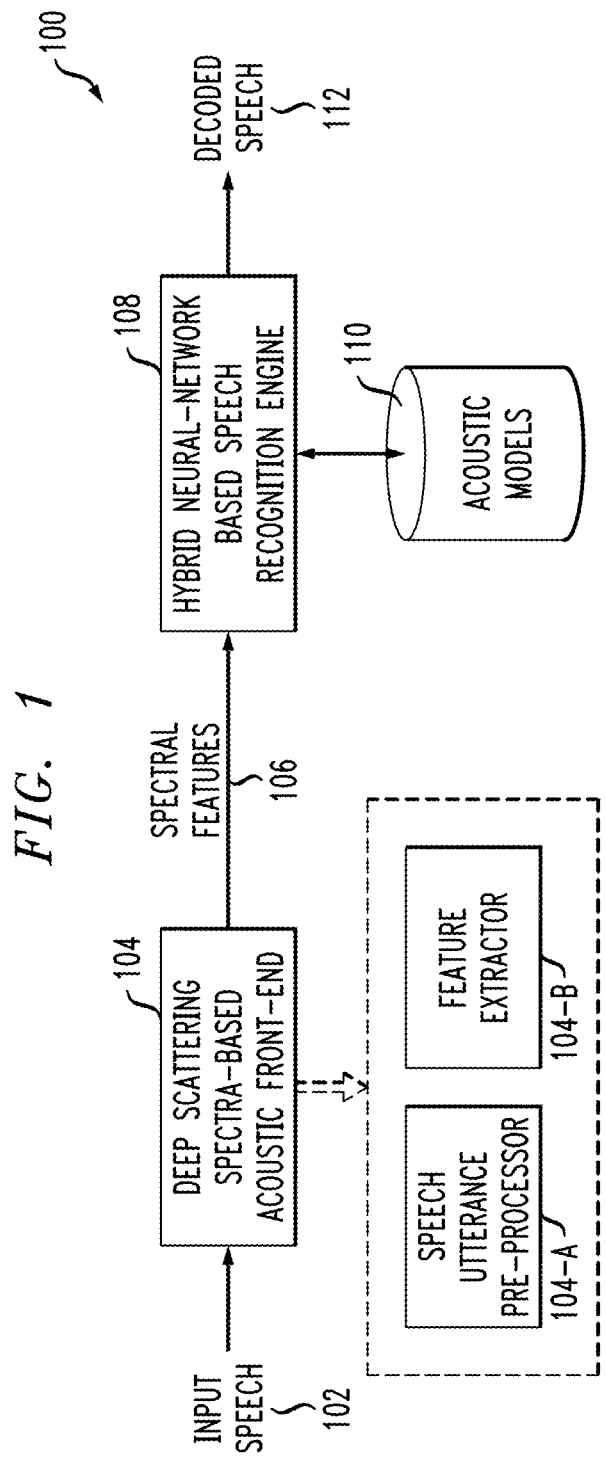
FIG. 1 illustrates a deep scattering spectrum-based speech recognition system according to an embodiment of the invention.

FIG. 1 illustrates a deep scattering spectrum-based speech recognition system according to an embodiment of the invention. As shown, in general, system 100 receives input speech 102, and processes the speech via deep scattering spectra-based acoustic front-end 104, hybrid neural network-based speech recognition engine 108 and acoustic models 110, to decode the speech input and output decoded speech 112. That is, the system 100 performs a decoding or recognition task whereby the user's speech is input and decoded to generate a transcription (i.e., recognition results) that represents the input speech. It is realized that improved decoding or recognition performance is attained via the generation and use of DSS features and a hybrid neural network architecture according to embodiments of the invention to be further explained herein.

It is understood that front-end 104 comprises a speech utterance pre-processor module 104-A and a feature extractor module 104-B. The speech utterance pre-processor 104-A receives the user speech, typically in the form of testing or real-time utterances, and generates representative speech waveforms (i.e., a speech signal). The speech utterance pre-processor 104-A may comprise, for example, an audio transducer (e.g., a microphone) which transforms the received utterance into an analog electrical signal, and an analog-to-digital converter which converts the analog signal into a digital signal representation of the received utterance. Also, the speech utterance pre-processor 104-A may sample the speech signal at predetermined intervals and partition the signal into overlapping frames so that each frame can be discretely processed by the remainder of the system. The output signal from the speech utterance pre-processor 104-A is the sampled speech waveform or speech signal which is preferably recorded and presented to the feature extractor 104-B.

The feature extractor 104-B receives the speech signal and, as will be illustratively described herein, extracts DSS-based spectral features from the signal. The spectral features are associated with at least a portion of the real-time speech utterances are output by the feature extractor 104-B and passed on to the speech recognition engine 108, which uses acoustic models 110 to decode the speech data received during the course of a real-time application to generate the recognition results. Where conventional speech recognition engines have employed acoustic modeling techniques that use Gaussian Mixture Models (GMMs) to represent relationships (i.e., evaluate fit) between Hidden Markov Models (HMMs) and acoustic input (input speech), illustrative embodiments of engine 108 utilize neural networks, as will be further described, for such acoustic modeling in place of GMMs.

In the sections to follow, illustrative embodiments of the DSS-based feature representation, including time scatter, frequency scatter, and multi-resolution scatter, as well as neural network training of acoustic models based on the DSS feature representations, will be further described.

Time Scatter.

As is known from the above-referenced article J. Anden and S. Mallat, "Deep scattering spectrum," IEEE Transactions on Signal Processing, January 2014, log-mel features can be approximated by convolving in time a signal x with a wavelet filter-bank ($\psi\lambda_1$), taking the modulus (|.|), and then applying a low-pass filter ($\phi(t)$). This feature representation can be written as $|x*\psi\lambda_1|*\phi(t)$. Typically, for a log-mel representation, the time of this averaging filter $\phi(t)$ is chosen to be ~25 milliseconds and $\psi\lambda_1$ is a constant-Q filter-bank with Q=8. In illustrative embodiments described herein, first-order scatter features are referred to as $S_1$.

As is known, Q refers to the quality factor (Q-factor) associated with a wavelet transform, and a filter-bank is used to split the input signal into various frequency bands (e.g., high and low frequencies using high pass filter and low pass filter, respectively).

While time averaging provides features which are locally invariant to small translations and distortions, it also leads to loss of higher-order information in the speech signal, such as attacks and bursts. To recover this lost information, another decomposition of the sub-band signals is performed using a second wavelet filter-bank ($\psi\lambda_2$). This second decomposition captures the information in the sub-band signal, $|x*\psi\lambda_1|$, left out by the averaging filter $\phi(t)$ The decomposed sub-band signals $|x*\psi\lambda_1|*\psi\lambda_2$, are once again passed through the low-pass filter $\phi(t)$ to extract stable features. The second order scatter is computed using a constant-Q filter-bank with Q=1. Each of the decompositions $||x*\psi\lambda_1|*\psi\lambda_2|*\phi(t)$, has a limited number of non-zero coefficients, due to the band-limited nature of the signals $|x*\psi\lambda_1|$. Typically, only first and second order scatter is used for speech. Again, following the above terminology, the second order scatter is referred to as $S_2$. To ensure that the higher order scatter just depends on the amplitude modulation component of the speech signal, the higher order scatter is normalized by the lower order scatter, i.e., $(S_2/S_1)$.

More particularly, assume that the input speech signal provided to the feature extractor 104-B is represented by $x(t)=a(t)(e*h)(t)$, where:

a(t) represents the amplitude modulation;
e(t) represents the excitation; and
h(t) represents the transfer function of the resonance cavity.

So using this nomenclature, $S_1 x(t, \lambda_1)$ represents the first order scatter obtained by passing the signal x(t) through the wavelet transform $\psi_{\lambda_1}(t)$ followed by a modulus operator and low pass filter $\phi(t)$:

$$S_1 x(t, \lambda_1) = |x*\psi_{\lambda_1}(t)|*\phi(t)$$

Similarly, $S_2 x(t, \lambda_1, \lambda_2)$ represents the second order scatter obtained by passing the signals, $|x*\psi_{\lambda_1}(t)|$, through the wavelet transform $\psi_{\lambda_2}(t)$:

$$S_2 x(t, \lambda_1, \lambda_2) = ||x*\psi_{\lambda_1}|*\psi_{\lambda_2}|*\phi(t)$$

The second order coefficients are normalized by the first order coefficients at the corresponding time position to ensure that the normalized scatter coefficients just depend on the amplitude modulation of the signal, i.e.:

$$\frac{S_2 x(t, \lambda_1, \lambda_2)}{S_1 x(t, \lambda_1)} \approx \frac{|a*\psi_{\lambda_2}|*\phi(t)}{a*\phi(t)}$$

This hierarchical normalization technique makes the higher order coefficients sensitive to feature preprocessing techniques such as mean and variance normalization. Thus, it is realized herein that the higher order coefficients (features or scatter) are gainfully employed for modeling by performing normalization combined with speaker specific mean normalization, from a selection of the normalization techniques such as speaker specific mean normalization, speaker specific variance normalization, l2 normalization of the feature vector, hierarchical normalization and combinations thereof.

Figure 2A:
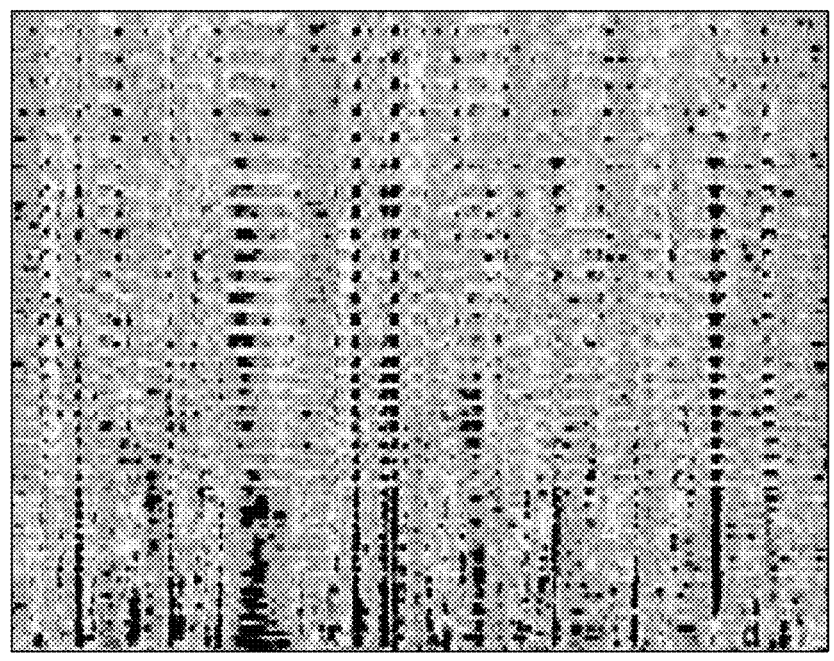
FIG. 2A illustrates a deep scattering spectrum feature plot according to an embodiment of the invention.

FIG. 2A illustrates a plot 200 of log $(S_2 x(t, \lambda_1, \lambda_2))$ across time and $\lambda_1$, $\lambda_2$ where $\lambda_1$ is the index of the wavelet filter-bank used in first order scatter and $\lambda_2$ is the index of the wavelet filter-bank used for second order scatter.

The above description is known as time scatter, as the wavelet convolution is applied to the time domain signal only. Next, we will describe frequency scatter.

Frequency Scatter.

Use of frequency scatter is a way of removing variability in the frequency signal, for example, due to translations of formants created from different speaking styles. A very simple type of frequency averaging is to apply a discrete cosine transform (DCT) to a log-mel representation and perform cepstral truncation, which is common when generating mel-frequency cepstral coefficients (MFCCs).

When applying frequency scatter in the DSS framework, the same time-scattering operation performed in time is now performed in the frequency domain on $S_1$ and $S_2$ features. Specifically, frequency scattering features are created by iteratively applying wavelet transform and modulus operators, followed by a low-pass filter, to the time-scatter features $S_i$, $|S_i * \psi^{fr}_{\lambda 1}| * \phi^{fr}(t)$. In this illustrative embodiment, all frequency-scattering features are produced using wavelets with Q=1. Further, in this illustrative embodiment, only first-order frequency scatter is computed.

Figure 2B:
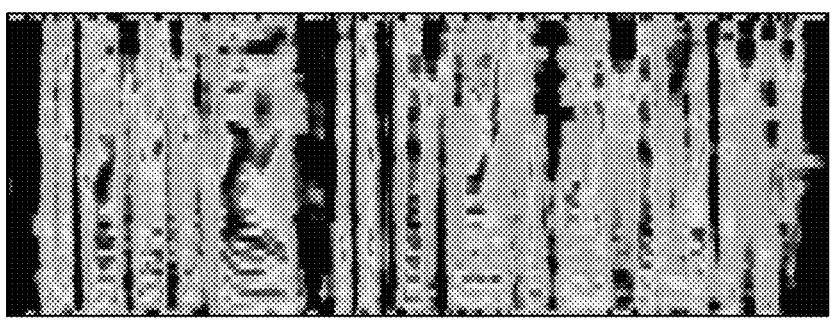
FIG. 2B illustrates a deep scattering spectrum feature plot according to another embodiment of the invention.

FIG. 2B illustrates a plot 250 of log ($S_1$ x(t, $\lambda_1$)) across time and frequency.

Multi-Resolution Scatter.

The first-order time-scattering operation described above is performed using a wavelet with Q=8. To capture different spectral and temporal dynamics, wavelets with different Q factors can be used in an operation referred to as multi-resolution time scatter. Frequency and second-order scatter are calculated on each first-order time scatter $S_1$ generated with filter-bank Q.

Neural Network Architecture.

As is known and mentioned above, HMMs are used in speech recognition systems as acoustic models because they are able to account for the temporal invariability of speech. Conventional speech recognition systems use Gaussian Mixture Models (GMMs) to determine how well each state of each HMM fits a frame (or window of frames) of coefficients that represent the acoustic input (input speech). Neural networks have been proposed as an alternative to GMMs to evaluate HMM fit. It is to be understood that the phrase "neural networks," as used herein, refers to artificial neural networks which simulate biological neural networks.

As used herein, two types of neural networks that are utilized include deep neural networks (DNNs) and convolutional neural networks (CNNs). A DNN refers to a neural network with at least one (but typically multiple) hidden layer of units between the input and output layers. A CNN refers to a neural network composed of one or more convolutional layers, and uses tied weights and pooling layers.

Accordingly, it is realized herein that since first-order time scatter features preserve locality in frequency as explained above, they can be modeled by CNNs. The second order time scatter, which is the decomposition of amplitude modulations in each sub-band of the first-order filter-bank ($|x * \psi \lambda_1|$), preserves the locality of information, for a given sub-band $\lambda_1$. However, each of these sub-band decompositions has a limited number of non-zero coefficients, and thus trying to model this with a CNN alone would be difficult as the resulting CNN filter size would be quite small in frequency. As a result, in accordance with one or more illustrative embodiments, a DNN is utilized for second-order scatter. Following a similar rationale, in accordance with one or more illustrative embodiments, DNNs are also used for frequency scatter.

Figure 3:
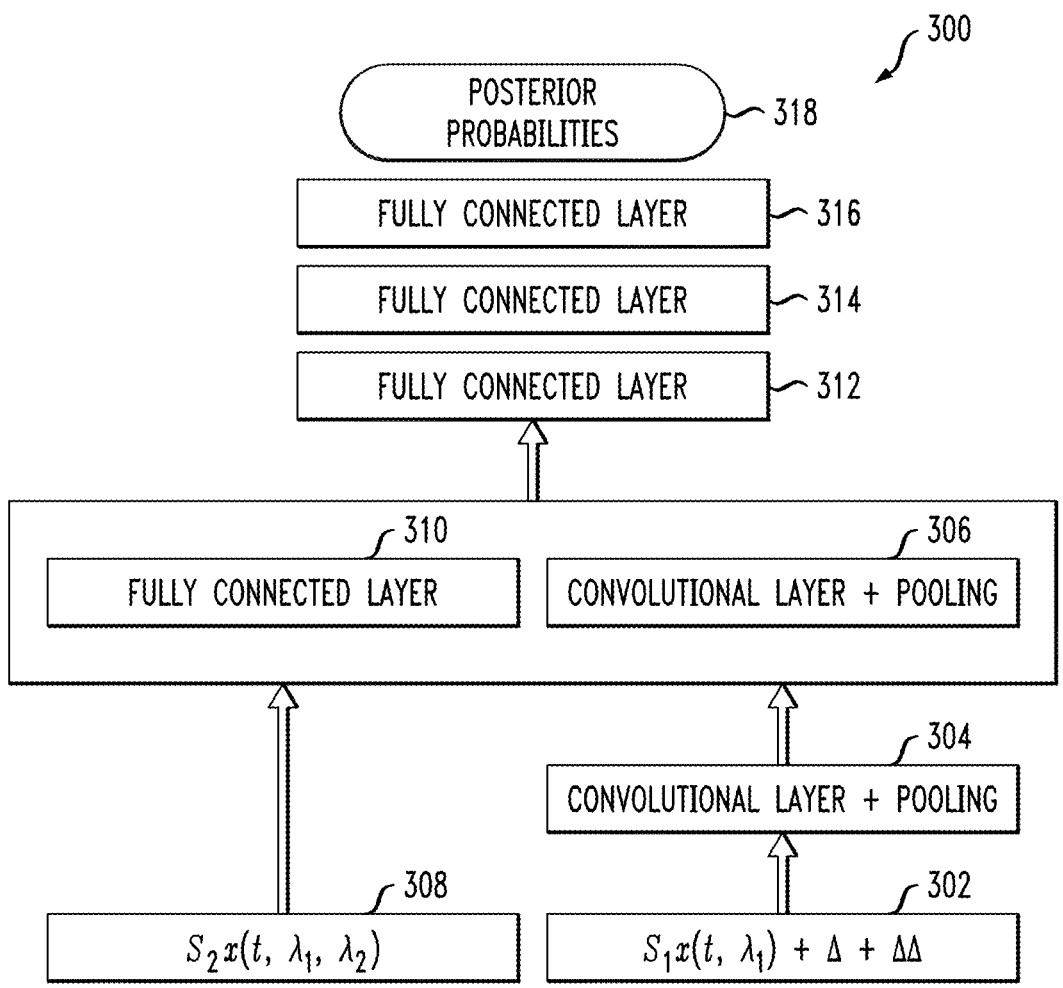
FIG. 3 illustrates a hybrid neural network architecture for use in the speech recognition system of FIG. 1.

Thus, to model DSS features, a joint CNN/DNN architecture 300 is used as illustrated in FIG. 3. The first order scatter 302 for each Q is input into separate convolutional layers 304 and 306. All second-order time scatter and first-and-second order frequency scatter 308 are fed as input into a fully connected layer 310. The output of this fully connected layer is then connected to the first fully connected layer 312 of the CNN, which also includes subsequent fully connected layers 314 and 316. The output layer of the architecture 300 is posterior probabilities layer 318. Thus, the hybrid neural network architecture 300 shown in FIG. 3 operatively combines a CNN and a DNN whereby the CNN is comprised of layers 304 and 306, and the DNN is comprised of layers 310, 312, 314 and 316.

Thus, given the input DSS feature S, which is comprised of [$S_1$-time $S_1$-freq and $S_2$], these features are fed into the joint CNN/DNN architecture 300. Features which have local correlations in frequency (i.e., $S_1$-time) are fed into the CNN and features which remove the local correlation ($S_1$-freq and $S_2$) are fed into the DNN layer. Each layer basically performs a multiplication of the input feature (either convolutive or full multiplication depending on CNN versus DNN) followed by a non-linearity. After multiple feature transformations are performed, the last (output) layer of the network produces a set of probabilities for each acoustic model class (i.e. $P(c_i|S)$). This is used as the emission probability in the HMM (replacing the probability coming from the GMM). This is referred to as hybrid decoding.

Furthermore, it is realized that use of Rectified Linear Units (ReLUs) as hidden units in the CNN/DNN hybrid architecture 300 serves to enhance the benefits exhibited by higher order scatter. This is due, at least in part, to the unbounded transfer function of ReLUs along the positive axis, which makes them less vulnerable to the dynamic range of features, and the non-linearity provided by ReLUs by sparsifying the gradient updates.

Dimensionality Reduction.

It is realized here that a feature extractor implementation with a Q=4 and 13 filter-banks provides a preferred (lowest) word error rate. However, this comes at the cost of a large increase in feature dimension. As such, one or more embodiments provide techniques for reducing the feature dimension for the $S_1$ frequency ($S_1$; f) and $S_2$ stream, fed into the DNN layer, as well as the $S_1$ time ($S_1$; t) stream, fed into the CNN layer.

Since a DNN does not require features to have correlations in time and frequency, unlike a CNN, standard dimensionality reduction techniques such as Principal Component Analysis (PCA) and Linear Discriminant Analysis (LDA) can be applied in illustrative embodiments.

Since scatter features in the CNN layer have time and frequency locality, neither PCA nor LDA can be applied. Instead, in illustrative embodiments, a linear bottleneck layer is introduced after the CNN streams, which is a preferred place to remove locality as these features are further passed into the DNN layer.

Figure 4:
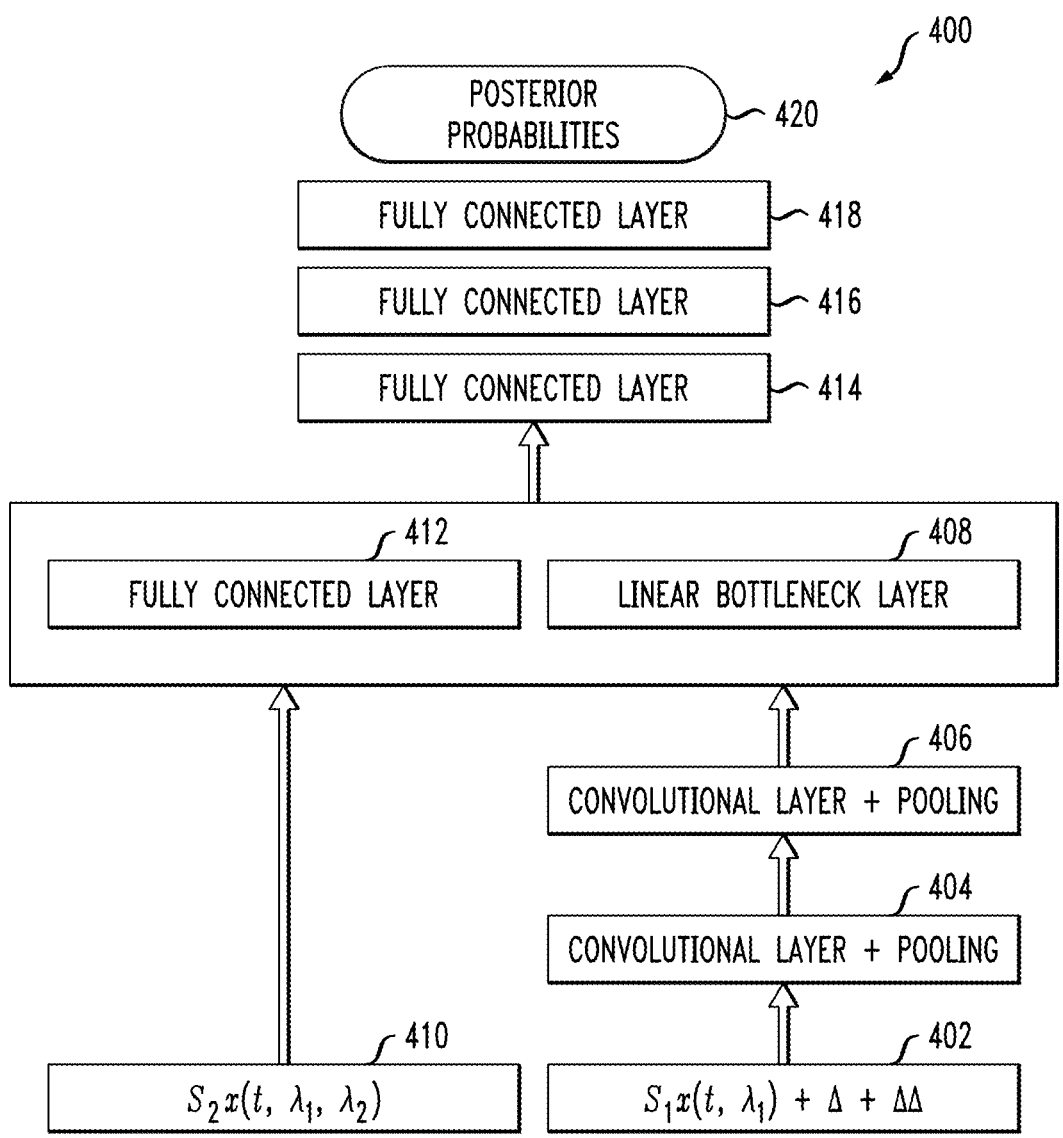
FIG. 4 illustrates a hybrid neural network architecture with dimensionality reduction functionality for use in the speech recognition system of FIG. 1.

FIG. 4 illustrates a hybrid CNN/DNN architecture which implements such dimensionality reduction. As shown in the architecture 400 of FIG. 4, the first order scatter 402 for each Q is input into separate convolutional layers 404 and 406. The CNN streams output from convolutional layer 406 are fed into a linear bottleneck layer 408, which provides the dimension reduction described above. All second-order time scatter and first-and-second order frequency scatter 410 are fed as input into a fully connected layer 412. The output of this fully connected layer is then connected to the first fully connected layer 414 of the CNN, which also includes subsequent fully connected layers 416 and 418. The output layer of the architecture 400 is posterior probabilities layer 420. Thus, in the hybrid neural network architecture 400 shown in FIG. 4, the CNN is comprised of layers 404 and 406, and the DNN is comprised of layers 412, 414, 416, and 418.

Speaker Adaptation.

LVCSR systems typically apply VTLN to log-mel features. First-order scatter is a similar operation to log-mel, with the exception that first-order scatter is computed using a Gabor filter-bank rather than a mel filter-bank. To apply VTLN to first-order scatter features, illustrative embodiments compute a set of warped Gabor filter-banks, and estimate the optimal warp factor for each speaker via maximum likelihood, as is done for mel filter-banks. For a given speaker, the first-order scattering features are computed using the warped Gabor filters. Warping the Gabor filters changes the center-frequency and bandwidth of each filter, as well as the low-pass filter $\phi(t)$, and thus the dimension of $S_2$ changes for each speaker since the non-zero $S_2$ coefficients are preserved. To have a constant $S_2$ dimension across utterances and speakers, $S_2$ is computed from the unwarped Gabor filters.

In addition to VTLN, fMLLR and i-vectors are also commonly used speaker adapted features. As fMLLR and i-vector features do not obey locality in frequency, they can be incorporated as additional features in to the DNN stream in one or more illustrative embodiments.

Sequence Training.

Since speech recognition is a sequence problem, it is realized here that the WER of neural networks can be improved using a sequence-level training criterion after cross-entropy training has finished. In one or more illustrative embodiment, sequence training is applied to the networks trained with speaker-adapted log-mel and DSS features. One example of sequence training that can be applied is described in B. Kingsbury, "Lattice-Based Optimization of Sequence Classification Criteria for Neural-Network Acoustic Modeling," Proceedings of ICASSP, 2009.

It is to be appreciated that embodiments of the invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
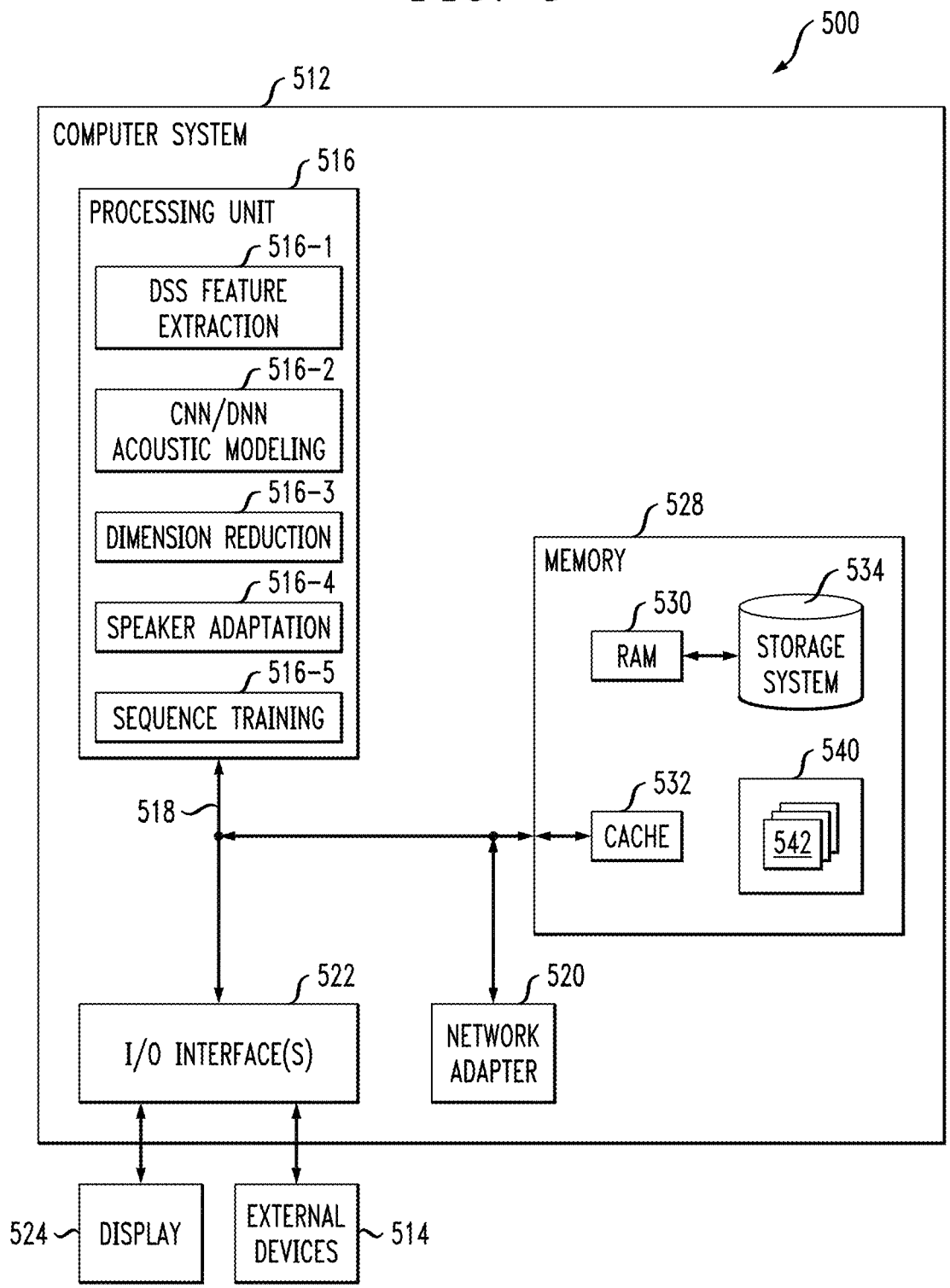
FIG. 5 illustrates a computer system for implementing one or more steps and/or components in accordance with one or more embodiments of the invention.

One or more embodiments can make use of software running on a general-purpose computer or workstation. With reference to FIG. 5, in a computing node 500 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 500 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. By way of example only, certain program modules 542 are shown as executing in processing unit 516, e.g., DSS feature extraction module 516-1, CNN/DNN acoustic modeling module 516-2, dimension reduction module 516-3, speaker adaptation module 516-4, and sequence training module 516-5. It is to be appreciated that more or less program modules may execute in processing unit 516.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via input/output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising: extracting deep scattering spectral features from an acoustic input signal to generate a deep scattering spectral feature representation of the acoustic input signal;
   inputting the deep scattering spectral feature representation to a speech recognition engine;
   decoding the acoustic input signal based on at least a portion of the deep scattering spectral feature representation input to a speech recognition engine; and
   outputting the decoded acoustic input signal;
   wherein the speech recognition engine utilizes a hybrid architecture comprising a combination of a deep neural network and a convolutional neural network to decode the acoustic input signal, and further wherein features in the deep scattering spectral feature representation that have a local correlation in frequency are fed into the convolutional neural network part of the hybrid architecture and features that remove the local correlation are fed into the deep neural network part of the hybrid architecture, and a set of probabilities output by the hybrid architecture are used to evaluate fit between a set of acoustic models and the acoustic input signal; and wherein a result of the evaluation of fit between the set of acoustic models and the acoustic input signal is output;
   wherein the extracting, inputting, decoding, and outputting steps are executed via a computer system comprising an acoustic signal processing unit and a memory.

2. The method of claim 1, wherein the extracting step further comprises extracting first-order scatter features from the acoustic input signal.

3. The method of claim 2, wherein extracting first-order scatter features from the acoustic input signal further comprises passing the acoustic input signal through a first wavelet transform, a modulus operator, and a low pass filter.

4. The method of claim 3, wherein the extracting step further comprises extracting second-order scatter features from the acoustic input signal.

5. The method of claim 4, wherein extracting the second-order scatter features from the acoustic input signal further comprises passing at least a portion of the acoustic input signal through a second wavelet transform.

6. The method of claim 5, wherein the extracting step further comprises normalizing the second-order scatter features based on the first-order scatter features.

7. The method of claim 5, wherein the extracting step is performed in the time domain.

8. The method of claim 5, wherein the extracting step is performed in the frequency domain.

9. The method of claim 5, wherein the extracting step is performed in a multi-resolution manner based on wavelets having different quality factors.

10. The method of claim 1, wherein the extracting step further comprises reducing a dimensionality of the deep scattering spectral features.

11. The method of claim 10, wherein the dimensionality reducing step further comprises performing a principal component analysis.

12. The method of claim 10, wherein the dimensionality reducing step further comprises performing a linear discriminant analysis.

13. The method of claim 10, wherein the dimensionality reducing step further comprises applying a linear bottleneck layer.

14. The method of claim 1, wherein the extracting step further comprises applying at least one of a speaker adaptation and a sequence training.

15. An article of manufacture comprising a non-transitory computer readable storage medium having tangibly embodied thereon computer readable program code which, when executed, causes an acoustic signal processing unit to:
    extract deep scattering spectral features from an acoustic input signal to generate a deep scattering spectral feature representation of the acoustic input signal;
    input the deep scattering spectral feature representation to a speech recognition engine;
    decode the acoustic input signal based on at least a portion of the deep scattering spectral feature representation via the speech recognition engine; and
    output the decoded acoustic input signal;
    wherein the speech recognition engine utilizes a hybrid architecture comprising a combination of a deep neural network and a convolutional neural network to decode the acoustic input signal, and further wherein features in the deep scattering spectral feature representation that have a local correlation in frequency are fed into the convolutional neural network part of the hybrid architecture and features that remove the local correlation are fed into the deep neural network part of the hybrid architecture, and a set of probabilities output by the hybrid architecture are used to evaluate fit between a set of acoustic models and the acoustic input signal; and wherein a result of the evaluation of fit between the set of acoustic models and the acoustic input signal is output.

16. An apparatus, comprising:
    a memory; and an acoustic signal processing unit operatively coupled to the memory and configured to:
    extract deep scattering spectral features from an acoustic input signal to generate a deep scattering spectral feature representation of the acoustic input signal;
    decode the acoustic input signal based on at least a portion of the deep scattering spectral feature representation via a speech recognition engine; and
    output the decoded acoustic input signal;
    wherein the speech recognition engine utilizes a hybrid architecture comprising a combination of a deep neural network and a convolutional neural network to decode the acoustic input signal, and further wherein features in the deep scattering spectral feature representation that have a local correlation in frequency are fed into the convolutional neural network part of the hybrid architecture and features that remove the local correlation are fed into the deep neural network part of the hybrid architecture, and a set of probabilities output by the hybrid architecture are used to evaluate fit between a set of acoustic models and the acoustic input signal; and wherein a result of the evaluation of fit between the set of acoustic models and the acoustic input signal is output.

* * * * *